United States Patent [19]

Masclet et al.

[11] 4,365,643
[45] Dec. 28, 1982

[54] FUSE DEVICE FOR A WHEEL EQUIPPED WITH A PNEUMATIC TIRE

[75] Inventors: Jean Masclet, Paris; Roger Papay, Bourg-la-Reine, both of France

[73] Assignee: Messier-Hispano-Bugatti, Montrouge, France

[21] Appl. No.: 203,540

[22] Filed: Nov. 3, 1980

[30] Foreign Application Priority Data

Nov. 13, 1979 [FR] France .............................. 79 27878

[51] Int. Cl.³ ....................... F16K 17/38; F16K 17/14
[52] U.S. Cl. .......................................... 137/70; 137/72; 137/224; 116/34 R; 116/218; 152/330 R; 220/89 A; 220/89 B; 244/103 R
[58] Field of Search .................. 152/330 R, 151, 153, 152/427, 428; 301/5 R, 5 VH, 96, 97; 138/89.2, 89.3, 89.4; 116/217, 218, 34 R; 244/103 R; 137/74, 516.11, 73, 70, 516.25, 72, 224; 220/89 A, 89 B

[56] References Cited

U.S. PATENT DOCUMENTS

| | | | |
|---|---|---|---|
| 3,200,987 | 8/1965 | Horner et al. | 301/5 R X |
| 3,559,668 | 2/1971 | Crossman | 301/5 R |
| 4,221,231 | 9/1980 | Harvey et al. | 152/427 X |
| 4,314,596 | 2/1982 | Keresztes | 137/74 X |

Primary Examiner—Caleb Weston
Assistant Examiner—Thomas Bokan
Attorney, Agent, or Firm—McAulay, Fields, Fisher, Goldstein & Nissen

[57] ABSTRACT

The present invention relates to a fuse for a wheel equipped with a pneumatic tire.

The fuse is constituted in the form of a screw (1) whereof the head (7) is traversed by an evacuation duct (3) receiving a check valve (8) obturating this duct (3); the fuse being characterized by the fact that it comprises a retainer (17), a part of which is embedded in the head, and another part cooperates with the check valve to hold it.

4 Claims, 2 Drawing Figures

FUSE DEVICE FOR A WHEEL EQUIPPED WITH A PNEUMATIC TIRE

BACKGROUND OF THE INVENTION

The present invention relates to fuses for wheels equipped with pneumatic tire, and more particularly on aircraft.

It is known that there already are safety devices which are mounted on the wheels of aircraft and which are intended essentially to prevent the pressure in the tires from rising to excessive pressures that can cause explosions. These pressure rises can be, for example, consecutive to a substantial braking when the aircraft cannot take off at the last moment, which considerably increases the temperature of the tires and hence the pressure of the fluid contained in the tires.

The known safety devices are constituted by bistable check valves whereof the obturator means is held against its seat by a plug of eutectic material which melts at a certain temperature, and of which a molten part is evacuated through orifices made in the head of the valve.

It has been noted that these devices do not give good results because the molten part of the eutectic, as it passes through the orifices, solidifies at the level of the orifices and prevents any additional leakage or creep of the plug of eutectic. The consequence is that the obturator means does not have sufficient displacement to permit the necessary evacuation of the inflation fluid from the tire, and the latter can then explode.

OBJECTS OF THE INVENTION

It is the object of the present invention to remedy these drawbacks and to provide a wheel fuse making it possible to evacuate the inflation fluid from the tire on the wheel to a sufficient extent and in complete safety.

More precisely, the object of the present invention is a fuse for a wheel equipped with a pneumatic tire, having a head traversed by an evacuation duct, a check valve obturating the said duct and capable of receiving the pressure of the said tire, and means to prevent the displacement of the said check valve, consisting of a retainer, a part of which is embedded in the head, and of another part which cooperates with the check valve to hold it, the retainer being capable of breaking up under the influence of a force beyond a certain level.

BRIEF DESCRIPTION OF THE DRAWINGS

The invention will be better understood with the aid of the example of embodiment described below, by way of non-limiting example, with reference to the attached figures in which.

SUMMARY OF THE INVENTION

The fuse of the invention consists essentially of a body traversed by a duct, obturated by a check valve which is held in place, in particular by a retainer or sleeve which prevents it from being displaced when pressure is applied to the piston. But this retainer having a predetermined coefficient of strength, is embodied in a material made to break up beyond a certain level of force.

Thus, when the pressure on the check valve rises and exceeds a certain threshold level that corresponds, on the retainer, to a force greater than that which the material can withstand, the latter breaks up and the check valve is displaced, allowing the fluid to flow, in particular from the tire.

This is important in avoiding blow-outs, particularly for aircraft tires.

It is known, however, that when the temperature in a tire rises, the pressure does so likewise, and in order to promote the breaking up of the retainer, the material of the latter is selected, for example, in the category of the eutectics, such as, for example, a lead-tin or cadmium-tin alloy. Thus, since the fuse is mounted in proximity to the tire, it assumes its temperature, and hence the retainer as well, which heats up and consequently the level of its coefficient of strength diminishes, promoting its breaking up under the pressure of the check valve.

DISCLOSURE OF BEST MODE OF THE INVENTION

Figure 1:
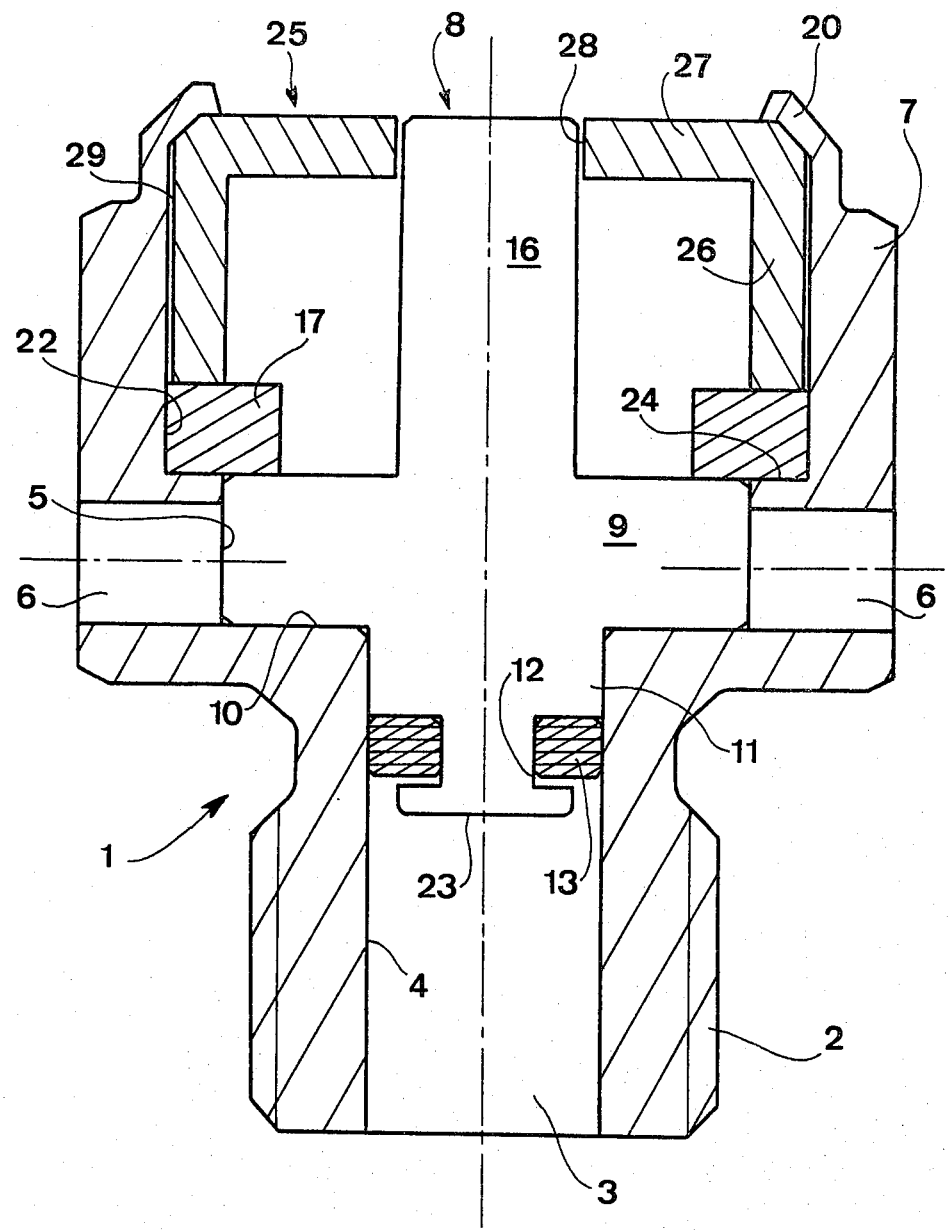
FIG. 1 represents, in axial section and on a large scale, an advantageous means of embodiment of a heat fuse as it is mounted on the wheel, when the temperature in the tire casing is normal.
Figure 2:
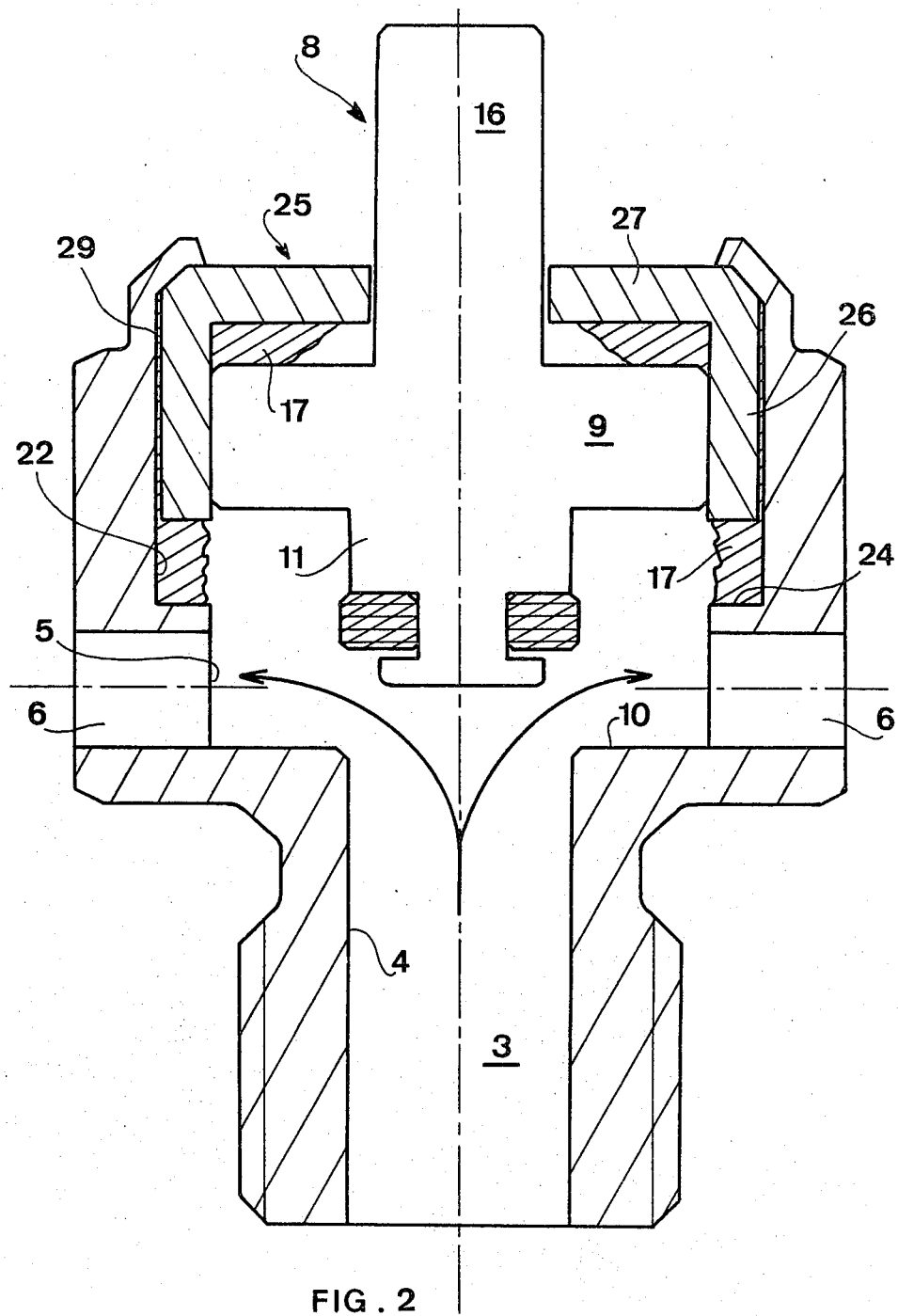
FIG. 2 represents, in the same configuration, the same means of embodiment of the fuse according to FIG. 1, but after having fulfilled its function, i.e. after the critical temperature has been reached.

FIGS. 1 and 2 represent a preferred means of embodiment of a fuse for a wheel equipped with a pneumatic tire, particularly for aircraft.

This fuse is constituted by a screw 1, whose threaded shaft 2 is fixed on the rim of the wheel, not shown in the figures. This screw 1 is drilled with a central channel 3 appearing in the form of three passages of different cross section, a passage of small section 4, or first passage, a passage of medium section 5, or second passage, and a passage of large section 22, or third passage. Lateral passages 6, which are four in number, disposed 90° apart, are formed in the head 7 of the screw 1 and terminate in the second passage 5. Inside the central channel 3 there is disposed a differential piston 8, since it exhibits two parts of different cross section, corresponding to those of the first and second passages 4 and 5 in screw 1, namely, a part of large section 9, sliding in passage 5 and resting on a shoulder 10 formed by the change in section of the first and second passages 4 and 5, and a part of small section 11, sliding in the first passage 4, and in which there is formed a groove 12, to receive a gasket 13 of rectangular section, preventing the air contained in the tire from escaping through the lateral passages 6, when the critical temperature is not reached; this part 11 terminates, toward the inner tube, in a plane face 23, perpendicular to the axis of piston 8, and in proximity to the groove 12 receiving the gasket 13. As for the part of large section 9 of piston 8, it is prolonged in a central shaft 16, extending in the interior of the third passage 22 of the head 7, which passage 22 receives the retainer embodied by a load of eutectic material, embodied in the form of an annular disc 17, centered in the interior of this third passage 22, and pressing both on a shoulder 24 formed by the change in section between the second and the third passage, as well as on the face of large section 9 of piston 8 turned toward the third passage 22, and on the other hand, a crosspiece 25, constituted by a cylindrical side wall 26, obturated at one end by a base 27 in which there is formed a bore 28, receiving the central rod 16 of piston 8, the cylindrical side wall 26 resting with its other end on the annular disc 17; a clearance 29 is formed between the cylindrical wall 26 and the bore of the third passage 22, and the disc 17 as well as crosspiece 25 are held in translation in the third passage 22 by crimping the upper edge 20 of head 7 on crosspiece 25.

With reference to FIG. 2, when the temperature of the air under pressure contained in the tire reaches the critical temperature, say, for example, 183° C., and with the annular disc embodied in a eutectic lead-tin alloy, or, according to another example, 176° C., with the annular disc 17 embodied in a eutectic cadmium-tin alloy, the annular disc 17 melts, and under the pressure prevailing in the tire, the piston 8 is raised from shoulder 10, so that its part of larger section 9 will slide inside the sidewall 26 of crosspiece 25, and entrain with it a molten portion of the alloy that constituted the annular disc 17. As soon as gasket 13 is no longer received in the first passage 4, the air under pressure will escape through the lateral passages 6, i.e. through paths different from those taken by the molten eutectic alloy that constituted the annular disc 17, which flows on the one hand, inside the sidewall 26 of crosspiece 25, and is brought, by the part of larger section 9 of piston 8, against the base 27 of crosspiece 25, and, on the other hand, in the clearance 29 between crosspiece 25 and the bore of the third passage 22. The central shaft 16 of piston 8, whose free end then projects from the base 27 of crosspiece 25, facilitates the guidance of piston 8 during the displacement of the latter, and simultaneously serves as a visual and/or tactile indicator of the condition of the fuse.

What is claimed is:

1. A fuse device for deflating a pneumatic tire in response to an excessive increase in pressure, comprising a screw member having a head and a channel therethrough;

said channel including first, second and third bores of small, medium and large cross-sections, respectively;

at least one transverse air evacuation passage extending from said second bore to the outside of said device in said head;

a piston slidably mounted in said channel, said piston including two parts of different cross-sections corresponding to said first and second bores;

one of said parts being relatively large and being slidably disposed in said second bore;

the other of said parts being smaller and slidably disposed in said first bore;

said smaller part having a peripheral groove;

a gasket in said groove adapted to prevent escape of air through said lateral passage;

said large part of said piston including a projecting section extending into said third bore;

a cylindrical stop member in said third bore;

said stop member including at one end thereof an opening receiving said projecting section, and, at its other end, a peripheral shoulder; and, an annular disk in said third bore between said large part of said piston and said peripheral shoulder, said disk consisting of a material capable of breaking up upon the application thereon of a pressure exceeding a predetermined amount;

whereby when said predetermined air pressure against said piston is exceeded said disk breaks up to allow said piston to rise in said third bore and said gasket to enter said second bore thereby allowing air to escape through said transverse passage while fragments of said disk escape through said channel without blocking said channel.

2. The device of claim 1, wherein the projecting section of said piston forms a shaft having a length sufficient to project from said device when said disk has broken up to thereby serve as a visual and/or tactile indicator of the condition of said device.

3. The device of claim 1, wherein said material is a eutectic.

4. The device of claim 3, wherein said eutectic is an alloy of lead-tin or cadmium-tin.

* * * * *